(12) United States Patent
Bedoret et al.

(10) Patent No.: US 11,931,957 B2
(45) Date of Patent: *Mar. 19, 2024

(54) DEVICE AND METHOD FOR MANIPULATING PARTICLES

(71) Applicant: AEROSINT SA, Herstal (BE)

(72) Inventors: Alexis Bedoret, Namur (BE); Matthias Hick, Limbourg (BE); Kevin Eckes, Etterbeek (BE)

(73) Assignee: AEROSINT SA, Herstal (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,779

(22) Filed: Apr. 14, 2022

(65) Prior Publication Data

US 2022/0234290 A1 Jul. 28, 2022

Related U.S. Application Data

(63) Continuation of application No. 16/336,326, filed as application No. PCT/EP2017/071039 on Aug. 21, 2017, now Pat. No. 11,338,509.

(30) Foreign Application Priority Data

Sep. 29, 2016 (BE) .................................. 2016/5725

(51) Int. Cl.
| | |
|---|---|
| *B29C 64/205* | (2017.01) |
| *B22F 12/50* | (2021.01) |
| *B29C 64/141* | (2017.01) |
| *B29C 64/159* | (2017.01) |
| *B33Y 10/00* | (2015.01) |
| *B33Y 30/00* | (2015.01) |

(Continued)

(52) U.S. Cl.
CPC ............ *B29C 64/205* (2017.08); *B22F 12/50* (2021.01); *B29C 64/141* (2017.08); *B29C 64/159* (2017.08); *B33Y 10/00* (2014.12); *B33Y 30/00* (2014.12); *B22F 10/28* (2021.01); *B22F 12/45* (2021.01); *B22F 12/55* (2021.01); *B22F 12/57* (2021.01)

(58) Field of Classification Search
CPC ... B29C 64/205; B29C 64/141; B29C 64/159; B29C 64/10; B22F 10/20; B22F 12/00; B22F 3/004; B22F 7/06; B22F 2999/00
See application file for complete search history.

(56) References Cited

U.S. PATENT DOCUMENTS

| | | | |
|---|---|---|---|
| 4,938,816 A * | 7/1990 | Beaman | B22F 7/02 |
| | | | 264/435 |
| 5,257,657 A | 11/1993 | Gore | |

(Continued)

FOREIGN PATENT DOCUMENTS

| | | |
|---|---|---|
| CN | 103978206 A | 6/2011 |
| DE | 9018138 U1 | 2/1996 |

(Continued)

*Primary Examiner* — Nahida Sultana
*Assistant Examiner* — Mohamed K Ahmed Ali
(74) *Attorney, Agent, or Firm* — Christensen O'Connor Johnson Kindness PLLC

(57) ABSTRACT

A device and method for manipulating particles is provided. The device generally includes a screen acting as a support for a structure formed by particles, which may be selectively deposited on a first substrate. The device may be included in a 3D printing system.

11 Claims, 12 Drawing Sheets

(51) Int. Cl.
  *B22F 10/28* (2021.01)
  *B22F 12/45* (2021.01)
  *B22F 12/55* (2021.01)
  *B22F 12/57* (2021.01)

(56) References Cited

U.S. PATENT DOCUMENTS

| | | |
|---|---|---|
| 5,637,176 A | 6/1997 | Gilleo et al. |
| 5,767,877 A | 6/1998 | Mei et al. |
| 2002/0155254 A1* | 10/2002 | McQuate ................ B05D 1/32 118/200 |
| 2004/0084814 A1* | 5/2004 | Boyd ...................... B29C 64/35 264/109 |
| 2013/0077997 A1* | 3/2013 | Hanson ................. G03G 15/24 399/130 |
| 2014/0167326 A1 | 6/2014 | Jones et al. |
| 2017/0072466 A1* | 3/2017 | Zehavi ................... B33Y 30/00 |
| 2018/0141126 A1* | 5/2018 | Buller ................... B29C 64/153 |
| 2019/0022937 A1* | 1/2019 | Stelter .................. B29C 64/218 |

FOREIGN PATENT DOCUMENTS

| | | |
|---|---|---|
| JP | H0818375 B2 | 2/1996 |
| JP | 2014-517350 A | 7/2014 |
| WO | 95/26871 A1 | 10/1995 |
| WO | 2008/028443 A2 | 3/2008 |

\* cited by examiner

DEVICE AND METHOD FOR MANIPULATING PARTICLES

CROSS-REFERENCES TO RELATED APPLICATIONS

This application is a continuation of U.S. patent application Ser. No. 16/336,326, filed Mar. 25, 2019, which is a National Stage of International Application No. PCT/EP2017/071039, filed Aug. 21, 2017, which claims priority to Belgian Application No. BE2016/5725, filed Sep. 29, 2016, all the disclosures of which are incorporated by reference herein in their entirety.

TECHNICAL FIELD

According to a first aspect, embodiments of the present disclosure relate to a device for manipulating particles. According to a second aspect, embodiments of the present disclosure relate to a method for manipulating particles.

BACKGROUND

U.S. Pat. No. 5,767,877 discloses a device for manipulating particles. This device comprises a two-dimensional printing matrix intended to receive particles of toner. Each of the pixels of the matrix comprises a valve and a cavity. The cavities are separated from one another by a portion of surface. The matrix thus forms a support that has a first outer surface that has openings wherein the particles of toner are placed. The particles of toner are suctioned in the cavities for which the valves are open. Each cavity is provided to receive one single particle of toner. When a particle is in a cavity, it plugs the suction duct thereof, preventing the suction of other particles.

This known device has several problems. Firstly, the particles must have a substantially spherical shape, so as to be able to penetrate into the cavities and plug the suction ducts. Then, the particles must substantially be of all the same size, so as to be able to penetrate into the cavities and plug the suction ducts. Furthermore, the separations between the cavities are such that this device does not make it possible to constitute a continuous structure of particles.

SUMMARY

According to a first aspect, one of the purposes of the disclosure is to provide a device that makes it possible to create a continuous structure of particles of various sizes and shapes. To this end, the disclosure proposes a device for manipulating particles that includes a flow generator arranged to generate a transport fluid flow, and a screen having a first outer surface from which a particle structure. In an embodiment, the screen comprising through-holes opening via openings onto the first outer surface, and the transport fluid flow being provided to transport the particles to or from the first outer surface of the screen.

A screen makes it possible for the particle structure to be formed by particles piling up against the first outer surface and not in the screen. As this first outer surface is only "outer", it does not comprise the "inner" walls of the holes. Thus, particles of various sizes, shapes and materials may be included in the same particle structure against the first outer surface of the screen. Indeed, there is no condition on the material, the size or the shape of the particles. Furthermore, the particles may be against each other, without separation between them, which makes it possible for them to form a continuous structure of particles. They may also pile up in a direction perpendicular to the first outer surface of the screen, thus forming a structure of a certain thickness.

In the scope of the present disclosure, a screen is a porous medium permeable to the fluid (for example, the screen may comprise through-holes wherein the fluid may pass) and of which at least one first outer surface cannot be penetrated by the particles of the structure (i.e. the particles remain blocked against the first outer surface and do not penetrate into the screen).

The screen, or the first outer surface thereof, is used as a support for the particle structure.

In an embodiment of the disclosure, the screen comprises through-holes which open onto the first outer surface via openings. The holes and the openings thereof are arranged to allow the transport fluid flow to pass at least partially through the screen, and the openings, through the shape thereof and the arrangement thereof on the first outer surface, are arranged to block the particles. In some embodiments, the holes and the openings thereof are arranged to allow all of the transport fluid flow to pass through the screen. Additionally or alternatively, the holes in some embodiments pass through the screen through the thickness thereof, i.e. along a direction substantially perpendicular locally to the first outer surface. Additionally or alternatively, the screen in some embodiments has a second outer surface substantially parallel to the first outer surface and the thickness of the screen is delimited by the first and second outer surfaces.

In other words, the openings in the first outer surface of the screen are arranged such that the first outer surface blocks the particles outside of the screen, while still allowing the transport fluid flow to pass via the holes through the screen. The particles are thus blocked outside of the screen and not in the holes of the screen. Thus, the first outer surface of the screen is provided such that the particle structure may be formed against it.

In the scope of the present document, the first outer surface of the screen is understood as not comprising the inner walls of the holes in the screen, since the first outer surface is only an outer surface. Thus, the particles are blocked against the portions without holes of the first outer surface of the screen.

The first outer surface of the screen may be substantially flat. The first outer surface of the screen may be such that a straight segment that connects two points of the first outer surface of the screen is fully comprised in the first outer surface of the screen. The first outer surface of the screen may be convex. The first outer surface of the screen may be mainly cylindrical.

With the device according to embodiments of the disclosure, it is possible to manipulate particles individually or sets of particles. It is also possible to control the thickness of the particle structure, for example by scraping or by controlling the transport flow.

The device according to embodiments of the disclosure is capable of manipulating particles and creating a particle structure.

In an embodiment of the disclosure, the device makes it possible to selectively deposit a portion of the particle structure, for example on a first substrate.

In the scope of the present document, a "pixel" is a portion of a surface, for example of the first outer surface of the screen, which may be covered with particles independently from the remainder of the surface. A pixel is therefore an addressable portion of a surface, for example of the first outer surface of the screen. In the scope of the present document, a "voxel" is a portion of the particle structure that corresponds to one pixel.

The transport fluid flow may be seen, at a given instant, as a set of fluid flow elements, with each flow element corresponding preferably to a different pixel. In some embodiments, each transport fluid flow element has a mainly square or round section. This makes it possible for the pixels to have an approximately uniform extent in all of the directions.

The particles may, for example, comprise a polymer, a metal, a salt, a ceramic or an organic material. The particles may have a size distribution with an average size of, for example, 1 µm, 10 µm, 100 µm, 1 mm or 10 mm. The particles may have a mainly spherical shape or any other shape. The particles may be suitable for forming an object via 3D printing via a method of selective agglomeration. The particles may, on the contrary, be inert and difficult to agglomerate to be used as a support during a 3D printing.

In some embodiments, the screen may be made of different materials (metal, organic, polymer, ceramic, etc.), and produced by different methods (weaving, perforations, punching, chemical photoengraving, electroforming of metal (nickel, copper, gold, etc.), sintered powder or fibres, filtration foam, etc.).

In the scope of the present document, a "layer of particles" may be the particle structure formed against the first outer surface of the screen or may be created on a first substrate from the particle structure formed on the first outer surface of the screen. A layer of particles may also be called a stratum, in particular after a deposition from the first outer surface of the screen. The layer of particles is a mainly continuous layer of particles forming an "image" of particles.

The first substrate may comprise particles that are agglomerated beforehand and/or a solid object to be integrated with particles.

The creation of the structure formed by particles may be called "composition".

In some embodiments, the device comprises a supply of particles that supplies particles of a size that is sufficient to be blocked by the first outer surface of the screen.

In some embodiments, the first outer surface of the screen is the surface of the screen located opposite the flow generator.

In some embodiments, the device may further comprise a purge system for deeply washing the screen. For example, the purge system may be a suction strip provided to be put into contact or arranged in the proximity of the screen. In some embodiments, the purge system may include, for example, an aspirator, an ejection blade in an interior space of the screen if the first outer surface of the screen is convex or a suction blade outside the screen if the first outer surface of the screen is convex.

In an embodiment of the disclosure, the openings of the holes are arranged to block any spherical body of more than 1 mm in diameter, preferably 10 µm in diameter, more preferably 1 µm in diameter, and even more preferably 0.1 µm in diameter, outside of the screen.

In an embodiment of the disclosure, the openings of the holes are such that the diameter of the smallest circle circumscribed in any of the openings is smaller than the diameter of the smallest sphere inscribed in any of the particles.

This condition is sufficient such that no particle penetrates into any opening.

In some embodiments, the screen is a grid.

This makes it possible for the screen to be particularly simple and inexpensive. A grid comprises for example a plurality of elements that intersect by forming a mesh. A grid may be regular or irregular.

In an embodiment of the disclosure, the device is arranged such that the transport fluid flow passes only through predetermined portions of the first outer surface of the screen.

This makes it possible, for example, for several types of particles to be blocked against the first outer surface, in different portions of the first outer surface. Thus, the particle structure may comprise at least one first portion only comprising particles of a first type and a second portion only comprising particles of a second type. The types of particles are differentiated for example by at least one of: the size distribution thereof, the material thereof, the shape thereof, the colour thereof, the Young's modulus thereof, the density thereof, the thermal conductivity thereof, the electrical conductivity thereof, the magnetic permeability thereof, the resistance to corrosion thereof, the hardness thereof, the melting temperature thereof, the solubility thereof, the combustibility thereof, the hydrophobicity thereof, the chemical composition thereof.

This also makes it possible for the particles to form a precise pattern on the first outer surface, with this pattern corresponding to the portions of the first outer surface passed through by the transport fluid flow, potentially during several steps.

In an embodiment of the disclosure, the device comprises a means of movement of the flow generator.

This makes it possible to modify the portions of the first outer surface passed through by the transport fluid flow. The portions of the first surface may also be called "subsurfaces".

In an embodiment of the disclosure, the device comprises a mask between the flow generator and the screen.

The mask makes it possible to select which portions of the first outer surface are subjected to the transport fluid flow. Indeed, the portions of the masked first outer surface are not passed through by the transport fluid flow. The mask may be static, i.e. the structure thereof may not be modified. The mask may be dynamic, i.e. the structure thereof may be modified, for example via addressing. The mask, whether it is static or dynamic, may be mobile. The mask may correspond to the entire first outer surface or only to a portion of it. If the mask is flexible, the screen preferably makes it possible to provide it with a certain rigidity. In some embodiments, the mask is able to be detached from the screen. Thus, it is possible to avoid exposing the mask to an atmosphere that may damage it (temperature, humidity, dust, etc.). For example, detaching the mask before a sintering may be of interest in order to have it avoid the temperature linked to sintering.

The size of a pixel depends on the characteristics of the transport fluid flow and the distances between the mask, the flow generator and the screen.

In an embodiment of the disclosure, the device comprises a means of movement of the mask.

This may be particularly useful when the mask only corresponds to one portion of the first outer surface. The means for movement of the mask may be coupled with the means of movement of the flow generator such that the transport fluid flow and the mask correspond systematically to the same portions of the first outer surface. In some embodiments, the mask is moved parallel to the first outer surface. The movement of the mask may also make it possible to obtain a better resolution and to reduce the production costs. A movement of the flow generator may also make it possible to obtain a better resolution and to reduce the production costs.

In an embodiment of the disclosure, the mask is arranged such that the configuration of the open and closed portions thereof may be modified.

In an embodiment of the disclosure, the device comprises a valve matrix. For example, the mask comprises a valve matrix. In some embodiments, the valves may be addressed. In some embodiments, each valve may be addressed independently of the other valves. In some embodiments, each valve is arranged to control a transport fluid flow element.

In an embodiment of the disclosure, the size of each valve corresponds to the size of one pixel. In another embodiment of the disclosure, the size of a valve is less than or greater than the size of one pixel. An open valve makes it possible to allow the transport fluid flow to pass in order to suction the particles towards the first outer surface or to blow the particles from the first outer surface. Using a screen separate from the valve matrix makes it possible to protect the valve matrix of the working environment (heat, radiation, impact, humidity, electrostatic effects). Furthermore, the screen may be changed during maintenance without it being necessary to change the matrix and the matrix may be changed without it being necessary to change the screen. In some embodiments, the valve matrix is parallel to the first outer surface.

The valves may be, for example, solenoid valves, microspeakers, MEMS (piezo, electrostatic, solenoids, etc.).

In an embodiment of the disclosure, the device comprises a means of movement of the flow generator, a mask between the flow generator and the screen and a means of movement of the mask. The means of movement of the mask is coupled with the means of movement of the flow generator such that the transport fluid flow and the mask correspond to the same portions of the first outer surface.

In an embodiment of the disclosure, the flow generator comprises a suction device provided to create the transport fluid flow from the first outer surface to the flow generator.

This makes it possible to suction the particles towards the first outer surface, i.e. to attract them thereto.

In an embodiment of the disclosure, the device comprises a reservoir of particles.

The reservoir makes it possible for the supply of the transport flow with particles. The reservoir is arranged such that the flow suctioning these particles may suction them from the reservoir. The reservoir may comprise a flat surface, located facing the first outer surface, and whereon the particles are distributed.

In an embodiment of the disclosure, the flow generator comprises an ejection device provided to create the transport fluid flow from the flow generator to the first outer surface.

This makes it possible to eject the particles from the first outer surface, i.e. to eject them therefrom. In some embodiments, the transport fluid flow passes through the screen from the second outer surface to the first outer surface in order to eject the particles present on the first outer surface. The ejection device may for example comprise a blower or a sound wave emitter. The ejection device may be, for example, arranged to eject the transport fluid by pulses from 0.1 ms to 1 s. The transport fluid flow is selected to break the retaining or adhesion force between the first outer surface and the particles.

In an embodiment of the disclosure, the device further comprises a particle collector arranged to collect the particles coming from the first outer surface.

In an embodiment of the disclosure, the device comprises a means of spreading particles against the first outer surface of the screen.

This spreading means makes it possible to supply the first outer surface with particles. The spreading may be carried out for a particle structure located on the screen or under the screen. The spreading means may comprise a scraper that makes it possible for the particle structure to be approximately uniform and controlled by the scraping.

In an embodiment of the disclosure, the first outer surface of the screen extends mainly in a first direction and a second direction perpendicular to the first direction and in that the flow generator is arranged such that the transport fluid flow that it generates is substantially in a third direction perpendicular to the first and second directions.

This makes it possible to have a first outer surface that is mainly flat. The mask, if there is one, is then preferably also mainly flat.

In an embodiment of the disclosure, the first outer surface of the screen is substantially a convex surface, for example a cylinder, delimiting at least partially an interior space.

In some embodiments, the convex surface is closed on itself in order to form a loop. This may for example be a cone, a cylinder, a conveying surface, a mat or a belt. In some embodiments, the device is arranged such that the convex surface may rotate, such that a portion of the convex surface may be moved cyclically in order to continuously supply particles towards a detachment zone.

This makes it possible to create the particle structure and a deposition of the latter on a first substrate continuously.

In an embodiment of the disclosure, the flow generator is at least partially located in the interior space of the convex surface.

In some embodiments, the device is arranged such that the cylindrical screen may rotate about the axis thereof. In some embodiments, the cylinder is hollow.

In an embodiment of the disclosure, the flow generator comprises a first portion located in the interior space and a second portion located outside the interior space, the first portion and the second portion being connected fluidically by a fluidic communication means.

In some embodiments, the fluidic communication means comprises a pipe or a plurality of pipes. In some embodiments, the fluidic communication means passes through an end of the convex surface, for example of the cylinder, to make the junction between the first and the second portions of the flow generator.

In an embodiment, the first portion of the flow generator is at a fixed position with respect to an axis of rotation of the convex surface. In another embodiment, the device is configured such that the first portion of the flow generator may be moved with respect to this axis of rotation. For example, it is possible that the first portion of the flow generator be arranged to create a translation movement parallel and/or perpendicular to the axis of rotation of the convex first outer surface of the screen, for example of the cylindrical screen.

For example, a translation movement parallel to the axis makes it possible for each of the openings of the first portion of the flow generator to deposit particles over several parallel lines.

The first portion of the flow generator may also be called a "printing head". In some embodiments, the first portion of the flow generator is at least partially located between the axis of rotation and the portion of the screen from which the particles are ejected.

In an embodiment of the disclosure, the first portion of the flow generator is a rigid support that makes it possible to group the fluidic communication means and to direct the transport fluid flow towards a specific portion of the screen. In some embodiments, each fluidic communication means corresponds to a transport fluid flow element. The first portion of the flow generator makes it possible to align the fluidic communication means such that the fluid flow elements have a direction that is mainly parallel and preferably, mainly perpendicular to the first outer surface of the screen.

In another embodiment of the disclosure, the number of fluid flow elements is greater than the number of fluidic communication means. For example, there may be only one single pipe between the first and the second portions of the flow generator and the first portion of the flow generator may comprise a plurality of valves that may be addressed. Each fluid flow element then corresponds to a valve. In some embodiments, the device then comprises an electrical communication means that makes it possible to control the valves. This electrical communication means may be, for example, a cable passing through an end of the convex first outer surface, for example through an end of the cylinder.

In some embodiments, the transport fluid flow and in particular the transport fluid flow elements are perpendicular to the first outer surface of the screen in the detachment zone where the particles are driven by the transport fluid flow.

In an embodiment of the disclosure, the first portion or the second portion of the flow generator comprises a plurality of valves.

For example, the first or the second portion of the flow generator may include a valve matrix. If it is the second portion that comprises valves, each valve may be connected to a fluidic communication means. Each fluid flow element corresponds to a valve.

In an embodiment of the disclosure, each valve is arranged to control a transport fluid flow element arranged to pass through a portion of the first outer surface of the screen. This makes it possible for a precise control of the particles to be ejected or suctioned.

In an embodiment of the disclosure, the first portion of the flow generator comprises a plurality of openings directed towards the first outer surface of the screen, the device being arranged such that a transport fluid flow element passes in one of the openings. In some embodiments, each opening is in fluidic communication with a valve.

In an embodiment of the disclosure, the screen continuously provides material facing the openings, which deposits particles in a controlled manner on the first substrate. The controlling of the thickness of the particles deposited may, for example, be done by the position of a second scraper and/or by controlling the rotation speed of the screen.

Each opening is capable of depositing a line of particles. If the transport fluid flow is made of pulses, each opening is capable of depositing a line of pixels.

In an embodiment of the disclosure, the openings of the first portion of the flow generator are arranged to be staggered.

In an embodiment of the disclosure, the device further comprises a suction means arranged to retain the particles on the first outer surface.

This suction means may be, for example, a device that creates a depression in the interior space delimited by the first convex outer surface. This device for creating a depression may include, for example, a fan.

In an embodiment of the disclosure, the device further comprises a means of movement of the screen, for example in rotation and/or translation.

In some embodiments, this means of movement makes it possible to translate the screen having a first convex outer surface in a direction perpendicular to the axis of rotation thereof, for example to the axis of the cylindrical screen. For example, if this axis is horizontal, this movement means may be arranged to move the screen horizontally and/or vertically. Furthermore, it is also possible that this movement means makes it possible to translate the screen in a direction parallel to the axis of rotation thereof.

In an embodiment of the disclosure, the fluid is a gas.

In an embodiment of the disclosure, the fluid is a liquid.

In an embodiment of the disclosure, the screen comprises through-holes perpendicular to the first outer surface of the screen, and in some embodiments the holes are straight prisms or straight cylinders.

The fact that the holes have inner walls perpendicular to the first outer surface makes it possible for the particles to not be blocked in the holes.

Furthermore, the disclosure proposes a 3D printing system comprising: at least one device according to one of the embodiments of the disclosure, and an agglomeration means.

The 3D printing system may include, for example, two, three, four, etc. devices each having a screen having a first convex outer surface.

In some embodiments, the device thus makes it possible to deposit at least one portion of a stratum of particles and the agglomeration means makes it possible to agglomerate at least one portion of the stratum of particles.

In the scope of the present document, a stratum of particles is a layer of particles. For example, a stratum may be at least partially deposited using one or more devices for manipulating particles according to an embodiment of the disclosure.

The 3D printing system according to the disclosure has many advantages, of which: it is possible to form gradients of materials; it is possible to form strata resistant to corrosion; and it is possible to create mechanical non-chemical connections, between two different materials.

The voxels forming the printed parts may have different shapes and be comprised of different materials, with these materials being able to respond to different functions (colour, Young's modulus, density, thermal conductivity, electrical conductivity, magnetic permeability, resistance to corrosion or to fatigue, hardness, melting temperature, solubility, combustibility, wettability, chemical composition, or any other physical characteristic).

In an embodiment of the disclosure, the 3D printing system further comprises a means of uniformization of the height of the stratum of powder deposited on the 3D printing structure. This may be, for example, a blade that scrapes the particles forming protuberances, a compaction roller that renders the stratum more compact, a compaction plate that renders the stratum more compact and/or a generator of vibrations that flattens the stratum. For example, the compaction roller itself may be vibrating in order to fluidise the powder and improve the scraping (better surface condition and faster scraping). The means of uniformization may be covered with a non-stick coating in order to prevent the particles from adhering thereto.

In some embodiments, the 3D printing structure comprises a device for creating an internal atmosphere, for example a nitrogen atmosphere. This makes it possible to limit the risks of explosion and of oxidation and/or of alteration of the powder. In some embodiments, the powder reservoir, the screen and the 3D printing structure are in this inert atmosphere.

In some embodiments, the 3D printing system comprises a chamber that surrounds the reservoir of particles, the screen and the 3D printing structure. In some embodiments, for semi-crystalline polymer powder, the inside of this chamber is heated to a temperature that is greater than the crystallisation temperature of the powder and less than the melting temperature of the powder. This makes it possible to limit any deformation of the part under construction as an excessively high temperature would damage the quality of the scraping of the powder. For example, this temperature may be close to 178° C. for a PA12 powder.

The 3D printing system according to the disclosure is compatible with any material.

In an embodiment of the disclosure, the powder used to form the part under construction comprises at least one of the following materials: a polymer (for example: TPE, PP, PA12, PA6, TPU, conductive TPU, PEEK, PPS), a metal (titanium, steel, aluminium, copper, palladium, gold, chromium, magnesium, cobalt, silver, alloy, etc.), a ceramic (silica, alumina, etc.), a salt or an organic powder.

The 3D printing system according to the disclosure makes it possible for a selective depositing of particles of a first type and of a second type different from the first type. In some embodiments, the particles of different types are ejected so as to form a continuous stratum and without a particle hole on the 3D printing structure.

For example, the particles of the first type may be provided to be sintered in order to form the object under construction and the particles of the second type may be inert during the sintering. It is also possible that two types of particles are used for the construction of the object, which makes it possible to create a multi-material object. This makes it possible to create an object that has certain portions made of a conductive material and others of a non-conductive material, an object that has rigid portions and flexible portions, an object that has several colours, several surface states, an object that has soluble portions and insoluble portions, an object that has magnetic portions and non-magnetic portions.

In some embodiments, the 3D printing system comprises a means of movement of the 3D printing structure and/or of the first substrate. In some embodiments, this movement means makes it possible for at least one from among: a vertical translation, a horizontal translation in a first direction, for example left-right, a horizontal translation in a second direction, for example front-rear.

The agglomeration means makes it possible to adhere at least one portion of the particles deposited to the 3D printing structure, such that these particles are integrated into this 3D printing structure. In the scope of the present document, an agglomeration of particles is a fastening together of the particles. An agglomeration is preferably selective, in that inert particles are not agglomerated. An agglomeration may comprise at least one method from among the following: a heat treatment, a sintering, a melting, an application of glue, an application of binder. For example, the agglomeration means may comprise at least one from among: a furnace, a laser, an electron beam, a laser provided with a scanning system in order to be able to heat the entire stratum, a halogen lamp, a local or uniform chemical reaction. The agglomeration may be carried out uniformly line-by-line, by sweeping in one single direction with a beam heating the material along a line. The agglomeration means may move at the same time as the screens or be decoupled from the latter.

In some embodiments, the system is arranged such that the means of agglomeration agglomerate the particles outside of the detachment zone where the particles are deposited on the 3D printing structure.

In an embodiment of the disclosure, the 3D printing system further comprises a means of deposition of the particle structure present against the first outer surface of the screen. Furthermore, the deposition means may be the ejection device.

The deposition means, which may form a part of the device for manipulating particles, may make it possible to form a stratum of particles.

The deposition means makes it possible to detach the particle structure from the first outer surface of the screen. In some embodiments, the deposition means makes it possible to deposit the particle structure against a 3D printing structure, for example, on a 3D printing structure. It may also optionally make it possible to move the screen, for example vertically, such that the particle structure of the first outer surface is against the 3D printing structure. The deposition means of the particle structure may, for example, comprise the flow generator, in particular if the latter is an ejection device.

In an embodiment of the disclosure, the deposition means comprises a mobile transfer substrate that has a transfer surface that may be positioned facing the first outer surface of the screen such that at least one portion of the particles present against the first outer surface of the screen may be transferred on the transfer surface of the transfer substrate. In some embodiments, the layer of particles against the transfer surface is created several times, for example by several successive ejections of particles against the first outer surface of the screen.

The layer of particles may thus be formed on the transfer surface of the transfer substrate. The transfer surface of the transfer substrate may be mainly flat and horizontal. It may be oriented downwards or upwards. It is the layer of particles against the transfer surface that is deposited against the 3D printing structure. In some embodiments, the layer of particles against the transfer surface is continuous, for example because the particle structure against the first outer surface of the screen was continuous or because several different particle structures were used to form the layer of particles against the transfer surface. The transfer substrate may comprise a second screen, in which case the screen against which is located the structure formed by particles can be called a first screen.

In an embodiment of the disclosure, the 3D printing system comprises a plurality of screens. In some embodiments, each screen manipulates a different powder. For example, the screens may comprise a first convex outer surface arranged to rotate according to an axis of rotation. The screens may be arranged such that the axes of rotation thereof are parallel. The screens may also be arranged so as to deposit the powders in two different directions.

This makes it possible for each screen to deposit a different powder on the 3D printing structure. The system may comprise one, two, three, four, etc. screens. In some embodiments, each screen is used to deposit a different powder on the 3D printing structure. They may have different particle sizes, materials and shapes or be scraped at different thicknesses for example.

In an embodiment of the disclosure, the 3D printing system further comprises a means for bringing together and for separating of the screen and of a 3D printing structure.

This makes it possible to separate little by little the 3D printing structure after the formation of each stratum of particles. For example, the 3D printing structure may be separated each time preferably by a distance between 20 and 1000 μm, more preferably between 50 and 200 μm. This may be the screen that moves away from the 3D printing structure and/or the 3D printing structure that moves away from the screen.

According to a second aspect, the disclosure proposes a method for manipulating particles comprising: (a) the supplying of a device for manipulating particles according to the disclosure; (b) the supplying of particles to the device; and (c) the transporting of particles by the transport fluid flow to or from the first outer surface of the screen.

This makes it possible to create a particle structure against the first outer surface of the screen or by ejection from the latter.

In an embodiment of the disclosure wherein the first outer surface is convex, the method includes that the rotation speed of the screen and the translation speed of the 3D printing structure are selected such that the difference in tangential speeds is zero in the detachment zone where the powder is ejected from the screen to the 3D printing structure. Ensuring a rotation that is faster or less faster than the forward speed in translation of the 3D printing structure makes it possible to control a transfer flow rate of particles that is faster or less faster.

The advantages mentioned for the system apply mutatis mutandis to the method.

In an embodiment of the disclosure, step (c) comprises the transporting of particles by the transport fluid flow to or from predetermined portions of the first outer surface of the screen. This makes it possible to select which particles are transported. The transport of particles may result from a rupture in the forces of adhesion between the particles and the screen. In the scope of the present document, a sound wave is considered as a transport fluid flow.

This makes it possible for certain pixels of the first outer surface to be covered with particles or, on the contrary, be released from particles. This may be done for example by applying a mask in the portions of the first outer surface where the transport of particles is not sought. This may also be done by applying the transport fluid flow only in the portions of the first outer surface where a transport of particles is sought.

In an embodiment of the disclosure, step (b) comprises the supply of particles of a first type and of a second type and step (c) comprises: a step (c1) of transport, by the transport fluid flow, of the particles of the first type to or from first predetermined portions of the first outer surface of the screen; and a step (c2) of transport, by the transport fluid flow, of particles of the second type to or from second predetermined portions of the first outer surface of the screen.

In an embodiment of the disclosure, step (b) comprises the supply of particles of a first type and of a second type and step (c) comprises: a step (c1) of transport, by the transport fluid flow, of particles of the first type to or from first predetermined portions of the first outer surface of a first screen; and a step (c2) of transport, by the transport fluid flow, of particles of the second type to or from second predetermined portions of the first outer surface of a second screen.

A type of particles may be specified by a characteristic of the particles or a set of characteristics of particles. For example, particles that have different materials, different shapes, different size distributions may be of different types. Such a structure is a composition of different types of particles.

In an embodiment of the disclosure, the particles of the first type are likely to be agglomerated by a determined method and the particles of the second type are not likely to be agglomerated by the method. For example, the particles of the first type are likely to be sintered at a first sintering temperature and the particles of the second type are not likely to be sintered at the first sintering temperature.

The particles of the first type may be used for 3D printing and the particles of the second type are used as support for 3D printing. The particles of the second type may be for example silica.

Furthermore, the disclosure proposes a 3D printing method comprising: the steps of the method for manipulating particles according to the disclosure, and the agglomeration of at least one portion of the particles.

The agglomeration may comprise an agglomeration of at least one portion of the particles of the stratum between them and/or an agglomeration of at least one portion of the particles of the stratum with a 3D printing structure. The agglomeration may take place point by point, line by line, plane by plane or also the entire volume of the 3D printing structure at one time. In the latter case, the deposition of the particle structure is carried out several times and the agglomeration is carried out one single time.

Furthermore, the disclosure proposes a 3D printing method comprising: the steps of the method for manipulating particles according to the disclosure; the deposition of the structure of particles present against the first outer surface of the screen, so as to form a stratum of particles; and the agglomeration of at least one portion of the stratum of particles.

In some embodiments, the deposition is a deposition on a 3D printing structure which is the already-constructed portion of a part printed via 3D printing.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The present disclosure is described with various embodiments and references to figures, but the disclosure is not limited by the latter. The drawings or figures described are only schematic and are not limiting. In the context of the present document, the terms "first" and "second" are only used to differentiate the various elements and do not imply an order between these elements. In the figures, identical or similar elements may bear the same references.

Figure 1A:
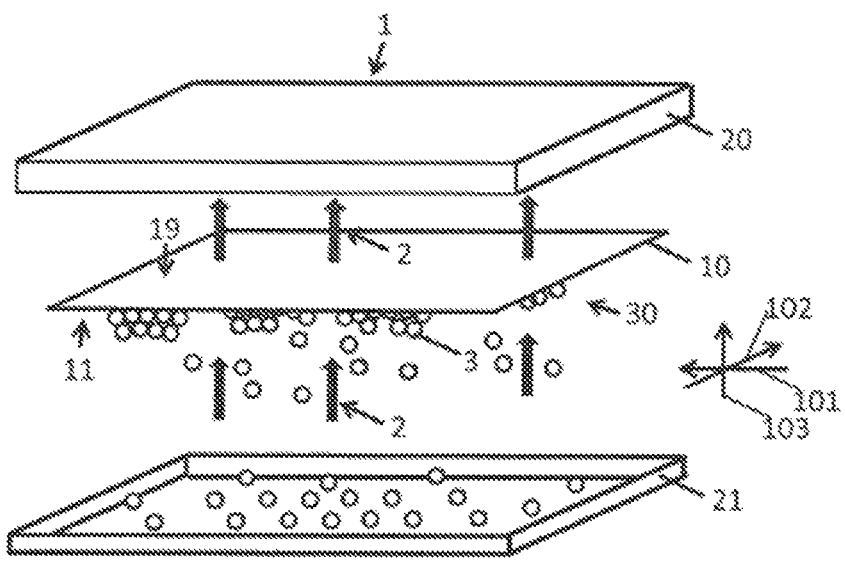
FIG. 1a shows a device for manipulating particles according to an embodiment of the present disclosure.
Figure 1B:
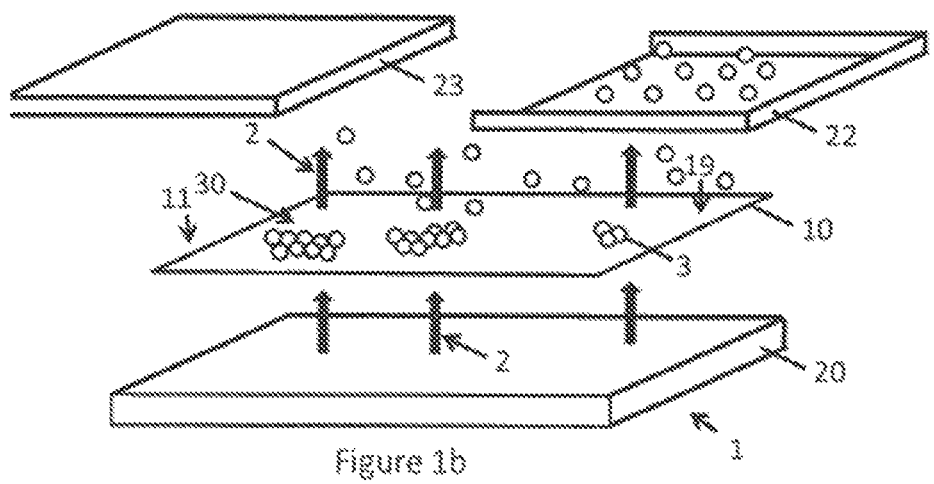
FIG. 1b shows a device for manipulating particles according to an embodiment of the present disclosure.

FIG. 1a shows a device 1 for creating a particle 3 structure 30 according to an embodiment of the present disclosure. FIG. 1b shows a device 1 for creating a particle 3 structure 30 according to an embodiment of the present disclosure. The device 1 comprises a flow generator 20 capable of generating a transport fluid flow. The flow generator 20 may be on or off so as to generate or cut off the transport fluid flow. It is possible, while still remaining within the scope of the disclosure, for the transport fluid flow 2 to be comprised of pulses.

The device 1 comprises a screen 10 that is a support for the particle 3 structure 30. The screen 10 has a first outer surface 11 and a second outer surface 19. The screen 10 has through-holes 12 (visible in FIG. 2a) that open onto the first outer surface 11 by the openings. The holes 12 also open onto the second outer surface 19. The openings block the particles 3 outside of the screen 10 and allow the transport fluid flow 2 to pass through the holes 12 through the screen 10. The device 1 may comprise a means of supplying with particles, for example in the form of a reservoir 21 of particles 3 (FIG. 1a) or a means for spreading 22 of particles 3 (FIG. 1b).

This blocking of the particles 3 may, for example, take place when the diameter of the smallest sphere inscribed in any of the particles 3 is greater than the diameter of the smallest circle circumscribed in any of the openings of the first outer surface 11. Furthermore, the blocking may also take place when the particles 3 create bridges above an opening. A bridge may arise when the diameter of the particles 3 is greater than one third of the diameter of the openings. The particles 3 then constitute an obstacle for the particles upstream, to the extent that they finish by piling up.

The particles 3 generally have a certain size distribution, for example a Gaussian distribution. Consequently, certain particles 3 risk passing through the screen 10 and therefore not being a part of the particle structure 30.

In some embodiments, the transport fluid 2 is a gas, for example air, argon or nitrogen. The transport fluid 2 may be a liquid, for example water.

In an embodiment of the disclosure, the screen 10 comprises elements that intersect, so as to block any spherical body more than 10 μm in diameter, preferably 1 μm in diameter, more preferably 0.1 μm in diameter. Any particle 3 of a size substantially greater than this diameter is thus blocked by the screen 10.

In an embodiment of the disclosure, the screen 10 is a grid, i.e. it comprises elements that form a mesh.

In an embodiment of the disclosure, the screen 10 is made from a biocompatible material. In some embodiments, the screen 10 is made from a material that is compatible with the constraints of a 3D printing environment (good resistance to high temperatures, to impacts, to humidity and to electrostatic charges).

In some embodiments, the structure of the screen 10 is fixed over time: there are no moving parts. In some embodiments, the screen 10 does not have an electrical function. It is possible, while remaining within the scope of the disclosure, that the screen be connected to the ground so as to discharge charged particles.

In an embodiment of the disclosure, the first outer surface 11 of the screen 10 is on the side opposite the screen 10 with respect to the flow generator 20. This may make it possible for the screen 10 to protect the flow generator 20 from fouling by particles 3.

The screen 10 may be produced by at least one of the following methods: weaving, perforations, chemical photoengraving, electroforming, sintered powder or fibres, and production of a foam.

In an embodiment of the disclosure, the first outer surface 11 of the screen 10 extends mainly along a first direction 101 and a second direction 102 perpendicular to the first direction 101. The flow generator 20 is thus arranged such that the transport fluid flow 2 that it generates is mainly in a third direction 103 perpendicular to the first 101 and second 102 directions. The particle 3 structure 30 is thus mainly two-dimensional.

The particle 3 structure 30 may comprise a continuous layer of particles 3. It may also comprise particle 3 islands separated from one another. The particle 3 structure 30 may comprise several types of particles 3.

In some embodiments, the flow generator 20 makes it possible to manipulate many particles 3 at the same time, for example at least ten particles 3 or at least one hundred particles 3. It is also possible that the flow generator 20 makes it possible to manipulate the particles 3 one by one.

In an embodiment of the disclosure, the device 1 comprises an equalising device, for example a scraper, that makes it possible to equalise the thickness of the structure 30 formed by particles 3.

In the embodiment of the disclosure shown in FIG. 1a, the flow generator 20 comprises a suction device provided to create the transport fluid flow 2 from the first outer surface 11 to the flow generator 20 (FIGS. 2, 4, 5, 9 and 11). This makes it possible to suction towards the first outer surface 11 particles 3 initially located on the other side of the screen 10 with respect to the flow generator 20. When the flow generator 20 comprises a suction device, the suction device is preferably located higher than the screen 10 and the particle 3 structure 30 is formed under the screen 10.

In the embodiment of the disclosure shown in FIG. 1b, the flow generator 20 comprises an ejection device provided to create the transport fluid flow 2 from the flow generator 20 to the first outer surface 11 (FIGS. 3, 6, 10 and 12). This makes it possible to eject from the first outer surface 11 particles 3 initially located on the other side of the screen 10 with respect to the flow generator 20. In the embodiment of the disclosure shown in FIG. 1b, the device 1 further comprises a spreading means 22, which may comprise a scraper, making it possible to supply the first outer surface 11 with particles 3. The spreading means 22 spread particles 3 over the first outer surface 11 and then the ejection device ejects at least one portion of the particles 3. In some embodiments, the ejected particles 3 are collected by a particle 3 collector 23.

In some embodiments, when the structure 30 formed by particles is below the screen 10, the structure 30 formed by particles adhere to the first outer surface 11 because the transport fluid flow 2 is maintained and/or by at least one of the following forces: gravity, centripetal force, mechanical pulse, magnetic force, aerodynamic force, electrostatic force, contact force, Van der Waals force, capillary force, acoustic pressure. These forces may be local, i.e. correspond only to certain portions of the first outer surface 11, or distributed, i.e. correspond to the entire first outer surface 11. Furthermore, these same forces may be used for detaching, locally or globally, from the screen 10 particles 3 forming part of the structure 30.

In some embodiments, the device 1 is arranged such that the transport fluid flow 2 passes only through predetermined portions of the first outer surface 11 of the screen 10. This arrangement may be carried out in different ways, which will be described hereinbelow. This may, for example, be carried out using a mask 40 (FIGS. 2, 3, 4 and 6), and/or a means of movement of the flow generator 20. A portion of the first outer surface 11 passed through by the transport fluid flow 2 independently of the remainder of the first outer surface 11 may be called "pixel". A pixel may also be a set of particles deposited on a first substrate 60 (FIG. 6) from a pixel of the first outer surface 11. In an embodiment of the disclosure, a pixel is between 10 μm×10 μm and 1 mm×10 mm, preferably a pixel is approximately 100 μm×100 μm. A pixel may be square, rectangular, a diamond, polygon, circular or have any other shape. Pixels may be different sizes and/or forms on the same screen 10. A voxel is the portion of the particle structure 30 that corresponds to a pixel. The thickness of the screen 10 as well as other parameters may have an impact on the thickness of a voxel. In an embodiment of the disclosure, the pixels are adjoining. In an embodiment of the disclosure, pixels partially overlap.

The mask 40 comprises open portions that allow the transport fluid flow 2 to pass and closed portions that do not allow the transport fluid flow 2 to pass.

In an embodiment of the disclosure, the mask 40 is dynamic, i.e. the configuration of the open and closed portions thereof may be modified. Such a dynamic mask 40 may for example comprise a valve matrix 41 (FIGS. 2, 3, 4, 6, 11 and 12).

In another embodiment of the disclosure, the mask 40 is static, i.e. the configuration of the open and closed portions thereof cannot be modified. The device 1 thus preferably comprises a means of movement of the flow generator 20.

The mask 40 may, for example, correspond to the entire first outer surface 11, a line of pixels of the first outer surface 11, two to twenty lines of pixels of the first outer surface 11, one to twenty-five pixels of the first outer surface 11 or a single pixel of the first outer surface 11. In some embodiments, if it corresponds to one portion only of the first outer surface 11, it is dynamic or the device 1 comprises a means of movement of the mask 40.

In an embodiment of the disclosure, the flow generator 20 and the mask 40 correspond to the entire first outer surface 11 of the screen 10. The flow generator 20 and the mask 40 may be then not provided to be moved.

Figure 2A:
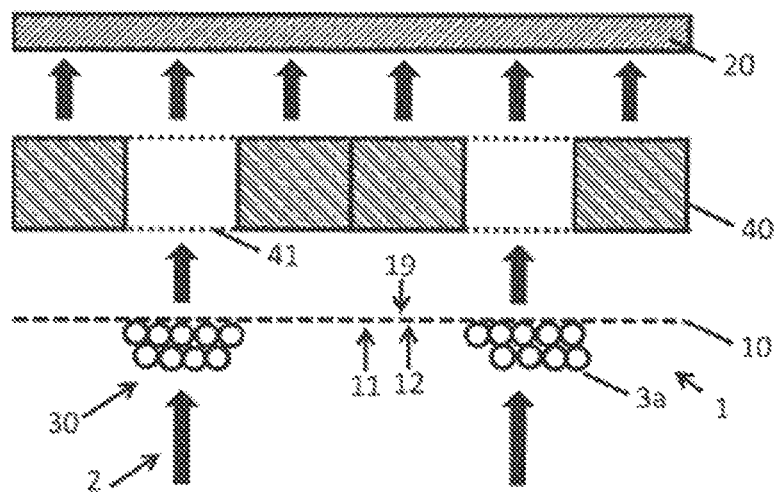
FIGS. 2a and 2b show two steps of using a device for manipulating particles according to an embodiment of the disclosure.
Figure 2B:
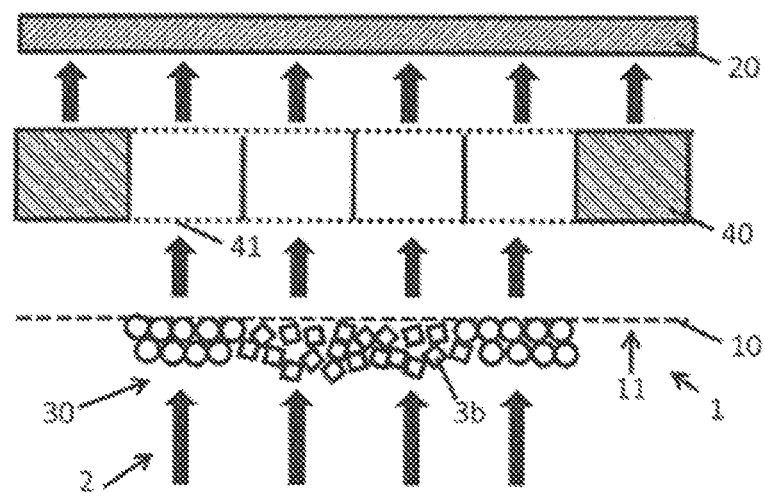

FIGS. 2a and 2b show two steps of using a device 1 according to such an embodiment of the disclosure, in a case where the flow generator 20 comprises a suction device. The mask 40 may comprise a valve matrix 41. The valves 41 may be opened independently from one another, such that the mask 40 allows the transport fluid flow 2 to pass where the valves 41 are open.

During the step shown in FIG. 2a, two first valves 41 are open, and the transport fluid flow 2 only passes through the portions of the first outer surface 11 that correspond to these first two valves 41. A first reservoir (not shown) containing particles 3a of a first type may thus be open facing the first outer surface 11, such that the particles 3a of the first type are suctioned by the transport fluid flow 2 and are placed against the portions of the first outer surface 11 corresponding to these first two valves 41.

During the step shown in FIG. 2b, two second valves 41 are open, and the transport fluid flow 2 only passes through the portions of the first outer surface 11 that correspond to these two second valves 41. A second reservoir (not shown) containing particles 3b of a second type may thus be open facing the first outer surface 11, such that the particles 3b of the second type are suctioned by the transport fluid flow 2 and are placed against the portions of the first outer surface 11 corresponding to these two second valves 41. The particles 3a of the first type remain against the first outer surface 11 for example because the first two valves 41 remain open and/or using at least one of the other forces mentioned hereinabove.

If the particle structure 30 obtained at this moment is the desired structure 30, the method of forming the structure 30 stops. Otherwise, the flow generator 20 may be activated and valves 41 may be opened and to suction pixels of particles 3. It is thus possible to suction a third type of particles.

Figure 3A:
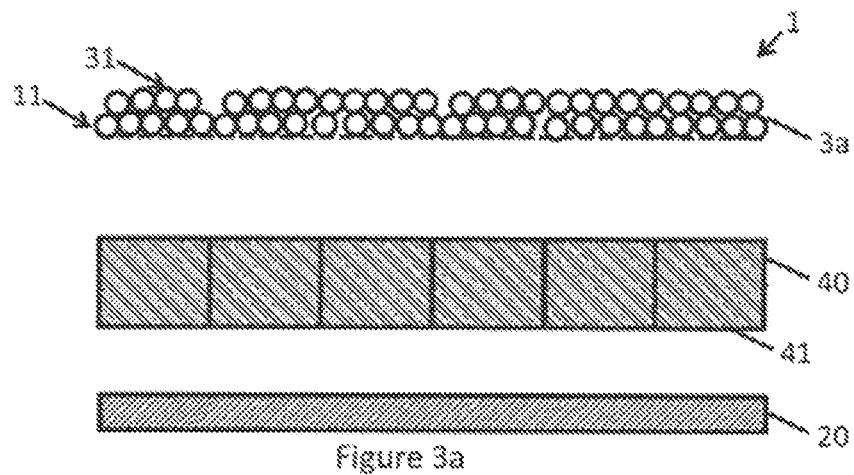
FIGS. 3a to 3c show three steps of using a device for manipulating particles according to an embodiment of the disclosure.
Figure 3B:
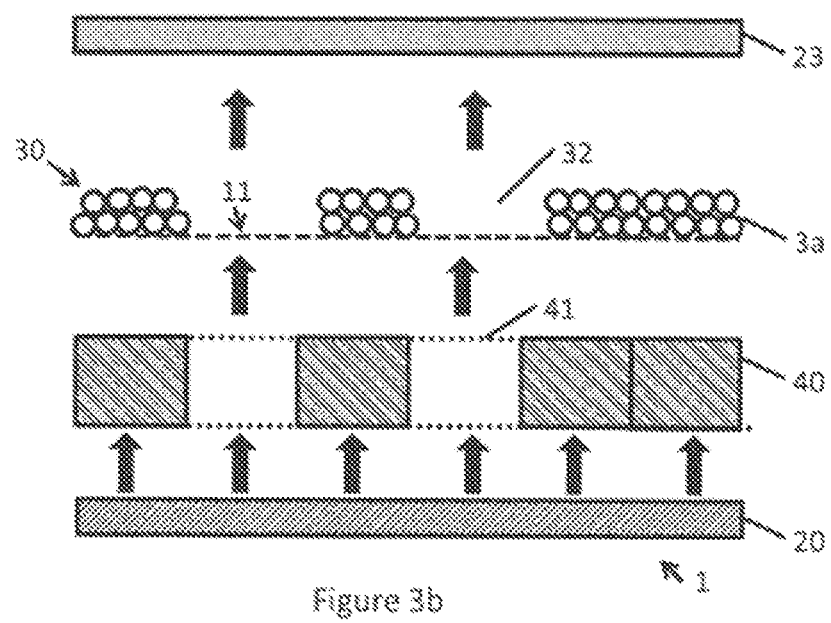
Figure 3C:
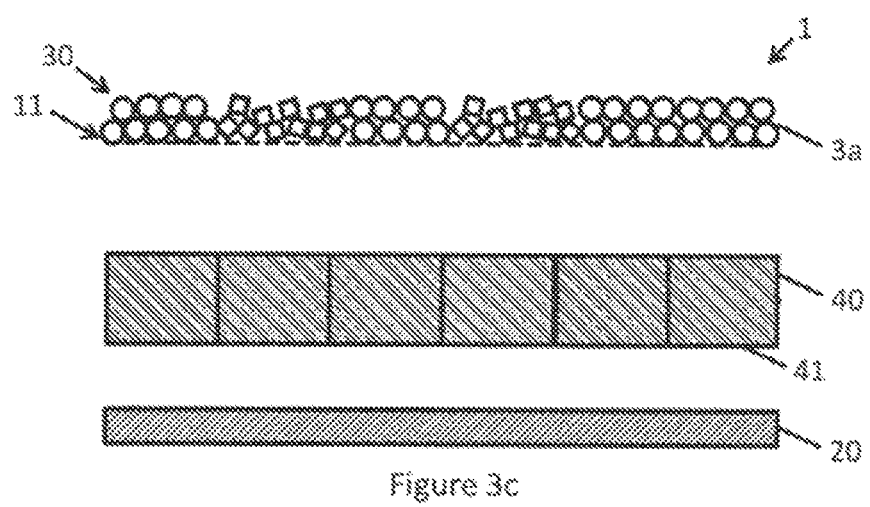

FIGS. 3a to 3c show three steps of using a device 1 according to another embodiment of the disclosure wherein the flow generator 20 and the mask 40 correspond to the entire first outer surface 11 of the screen 10, in a case wherein the flow generator 20 comprises an ejection device. The mask 40 may comprises a valve matrix 41. The valves 41 may be open independently from one another, such that the mask 40 allows the transport fluid flow 2 to pass where the valves 41 are open. Although FIGS. 3a to 3c show a situation wherein the particle structure 30 is located above the screen 10 and the ejection device is below the screen 10, it is possible, while still remaining within the scope of the disclosure, that the particle structure 30 is located underneath the screen 10 and the ejection device is above the screen 10. This corresponds to inverting all of each of FIGS. 3a to 3c in a horizontal plane.

FIG. 3a shows the situation before the use of the flow generator 20. The first outer surface 11 is covered with an initial layer 31 of particles 3a of a first type. The initial layer 31 has been deposited beforehand, for example, by a means of spreading 22 (FIG. 1b). The initial layer 31 preferably comprises only one single type of particles 3a.

During the step shown in FIG. 3b, two first valves 41 are open, and the transport fluid flow 2 only passes through the portions of the first outer surface 11 that correspond to these first two valves 41. The particles 3a of the first type located against the portions of the first outer surface 11 corresponding to these first two valves 41 are ejected by the transport fluid flow 2, leaving holes without particles 32. The ejected particles 3a may be collected by the particle collector 23. The particles 3a remaining on the first outer surface form the particle structure 30 at this moment.

During the step shown in FIG. 3c, the holes without particles 32 are filled with particles 3b of a second type using a supply of particles 3b, for example, by the spreading means 22 (FIG. 1b). If the particle structure 30 obtained at this moment is the desired structure 30, the method for forming the structure 30 stops. Otherwise, the flow generator 20 may be activated and valves 41 may be opened and for ejecting voxels of particles 3. It is thus possible to spread a third type of particles.

In an embodiment of the disclosure, the flow generator 20 and the mask 40 correspond only to a portion of the first outer surface 11. In some embodiments, the flow generator 20 and the mask 40 correspond to the same portion of the first outer surface 11. The flow generator 20 and the mask 40 may then be provided to be moved, for example parallel to the first outer surface 11.

FIGS. 4a to 4d show four steps of using a device 1 according to such an embodiment of the disclosure, in the case where flow generator 20 comprises a suction device. The mask 40 may comprise a valve matrix 41. The device 1 may comprise a means of movement of the flow generator 20. The valves 41 may be opened independently from one another, such that the mask 40 allows the transport fluid flow 2 to pass where the valves 41 are open.

Figure 4A:
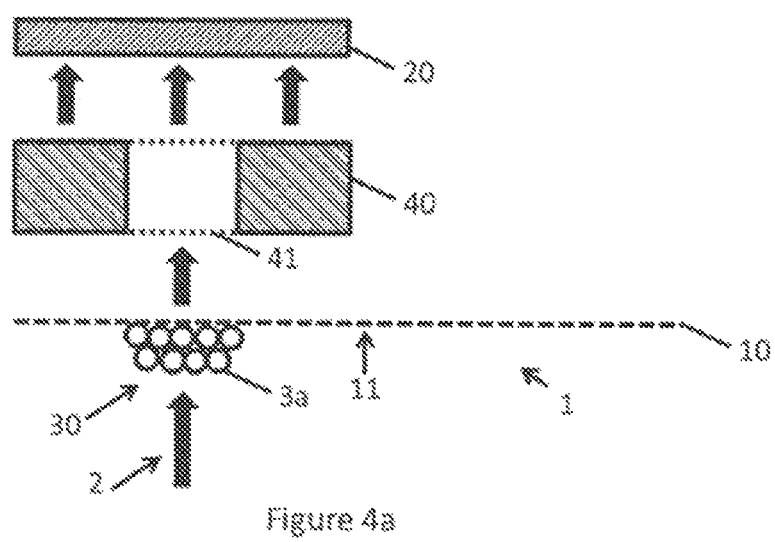
FIGS. 4a to 4d show four steps of using a device for manipulating particles according to an embodiment of the disclosure.

During the step shown in FIG. 4a, a first valve 41 is open, and the transport fluid flow 2 only passes through the first outer surface 11 corresponding to this first valve 41. A first reservoir (not shown) containing particles 3a of a first type may be open facing the first outer surface 11, such that the particles 3a of the first type are suctioned by the transport fluid flow 2 and are placed against the portions of the first outer surface 11 corresponding to this first valve 41.

Figure 4B:
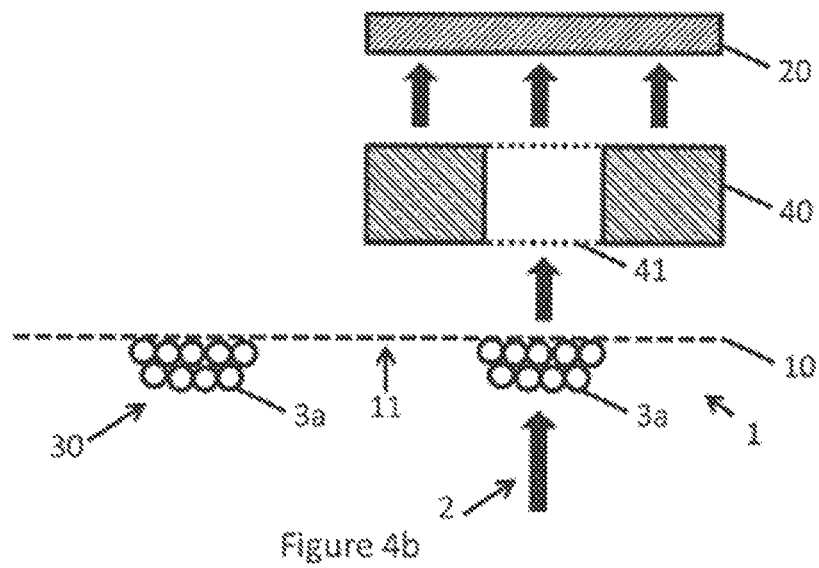

During the step shown in FIG. 4b, the flow generator 20 and the mask 40 are moved with respect to the arrangement shown in FIG. 4a. The first valve 41 is open, and the transport fluid flow 2 only passes through the portions of the first outer surface 11 corresponding to this first valve 41. A first reservoir (not shown) containing particles 3a of a first type may be open facing the first outer surface 11, such that the particles 3a of the first type are suctioned by the transport fluid flow 2 and are placed against the portions of the first outer surface 11 corresponding to this first valve 41 at this moment.

Figure 4C:
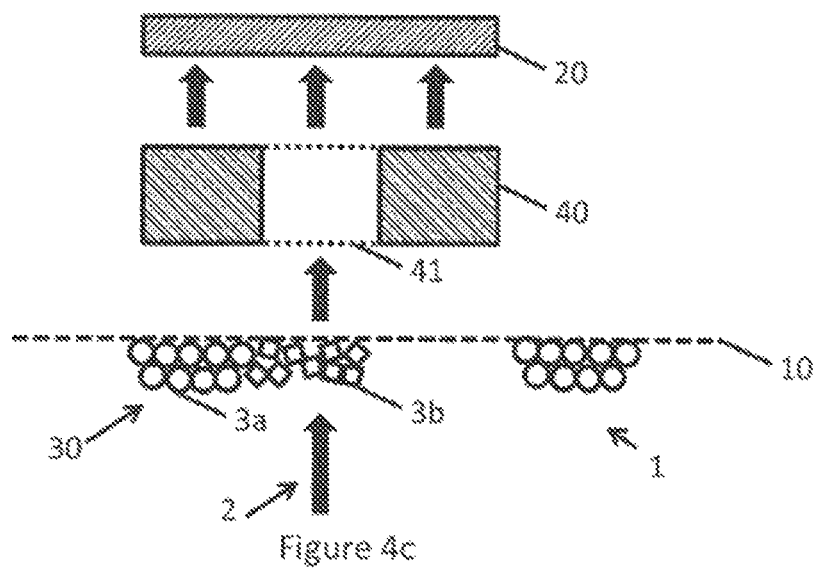

During the step shown in FIG. 4c, the flow generator 20 and the mask 40 are moved with respect to the arrangement shown in FIG. 4b. The first valve 41 is open, and the transport fluid flow 2 only passes through the portions of the first outer surface 11 corresponding to this first valve 41. A second reservoir (not shown) containing particles 3b of a second type may be open facing the first outer surface 11, such that the particles 3b of the second type are suctioned by the transport fluid flow 2 and are placed against the portions of the first outer surface 11 corresponding to this first valve 41 at this moment.

Figure 4D:
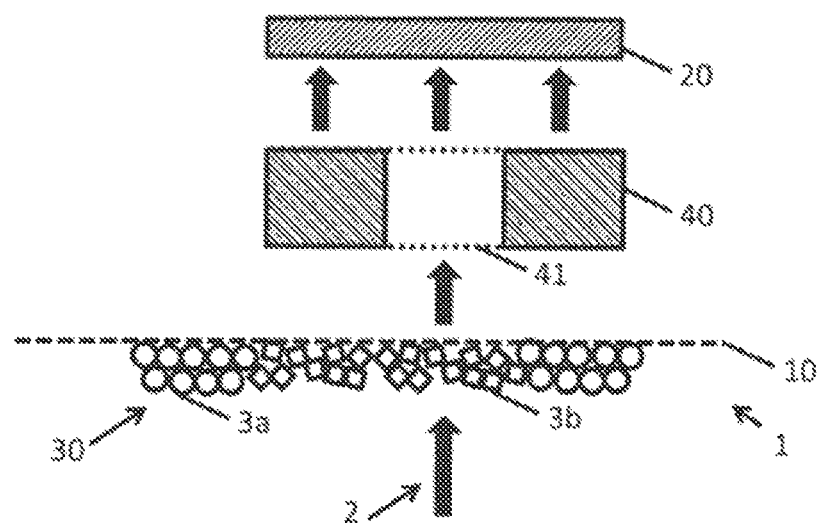

During the step shown in FIG. 4d, the flow generator 20 and the mask 40 are moved with respect to the arrangement shown in FIG. 4c. The first valve 41 is open, and the transport fluid flow 2 only passes through the portions of the first outer surface 11 that correspond to this first valve 41. A second reservoir (not shown) containing particles 3b of a second type may be open facing the first outer surface 11, such that the particles 3b of the second type are suctioned by the transport fluid flow 2 and are placed against the portions of the first outer surface 11 that correspond to this first valve 41 at this moment.

If the particle structure 30 obtained at this moment is the desired structure 30, the method of forming the structure 30 stops. Otherwise, the flow generator 20 may be activated and valves 41 may be open and be able to suction voxels of particles 3. It is thus possible to suction a third type of particles coming from a third reservoir.

It is also possible, while still remaining within the scope of the disclosure, that a valve other than the first valve 41 be open during one of the steps described in reference to FIGS. 4a to 4d.

The particles 3a, 3b remain against the first outer surface 11 for example using at least one of the other forces mentioned hereinabove.

In an embodiment of the disclosure not shown, the flow generator 20 and the mask 40 correspond only to a portion of the first outer surface 11 and the flow generator 20 comprises an ejection device.

In an embodiment of the disclosure, the mask 40 is not provided to be moved (it may for example correspond to the entire first outer surface 11) and the flow generator 20 is provided to be moved, for example using a means of movement of the flow generator 20.

In an embodiment of the disclosure, the device 1 does not comprise a mask 40 and the flow generator 20 is provided to be moved, for example using a means of movement of the flow generator 20.

Figure 5:
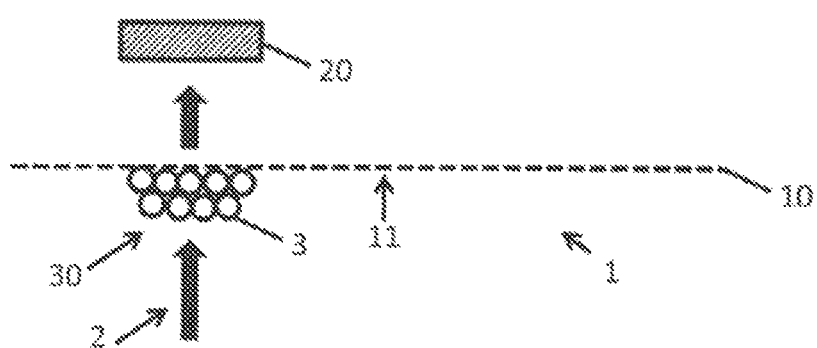
FIG. 5 shows a device for manipulating particles according to an embodiment of the disclosure.

FIG. 5 shows a device 1 according to such an embodiment of the disclosure. The flow generator 20 is arranged such that the transport fluid flow 2 passes through only one pixel of the first outer surface 11. The flow generator 20 is moved and the pixels of the first outer surface 11 are thus addressed one after the other to be covered with particles 3. The supply of particles may, for example, be done via a reservoir of particles that is moved below the screen 10 in parallel with the flow generator 20.

In an embodiment of the disclosure not shown, the device 1 does not comprise a mask 40 and the flow generator 20 is provided to be moved, for example, using a means of movement of the flow generator 20 and the flow generator 20 comprises an ejection device.

Figure 6:
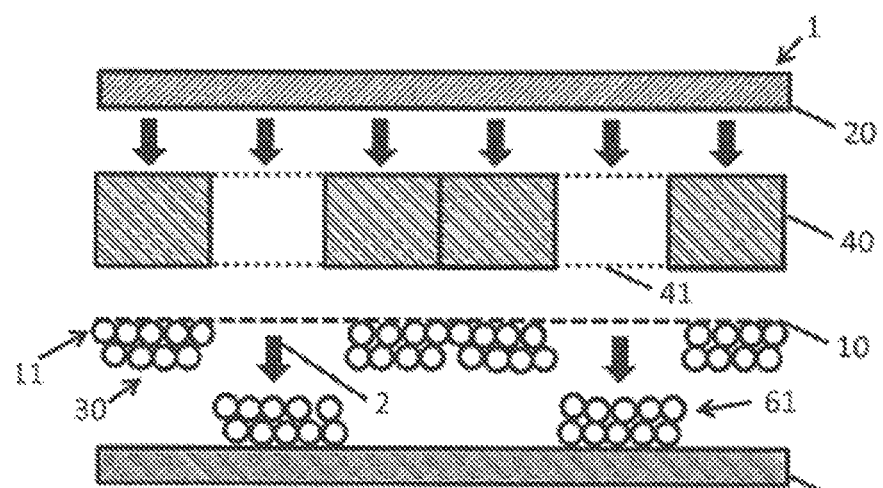
FIG. 6 shows a use of a device for manipulating particles according to an embodiment of the disclosure.

In an embodiment of the disclosure, for example the one shown in FIG. 6, predetermined portions of the structure 30 present against the screen 10 are selectively transferred on the surface of a first substrate 60, using the transport fluid flow 2 generated by the flow generator 20 which comprises an ejection device. It is possible that the ejection of the particles be carried out by acoustic pressure. This transfer may be for example carried out pixel by pixel. The first substrate 60 may comprise an upper portion of a 3D printing structure 72 (FIG. 7).

According to an embodiment of the disclosure, several successive transfers take place, from the particle structure 30 to the surface of the first substrate 60.

According to an embodiment of the disclosure, a first uniform structure 30 which comprises only a first type of particles 3a is firstly formed on or under the screen 10. Then, the predetermined portions of the first structure 30 are transferred on the first substrate 60. Then, the remainder of the first structure 30 is removed from the screen 10 and a second uniform structure 30 comprising only a second type of particles 3b is formed on or under the screen 10 and predetermined portions of the second structure 30 are transferred on the first substrate 60. The process may be repeated.

It is thus possible to produce a layer of particles comprising islands 61 of different types of particles on the first substrate 60. This layer may subsequently be used for a 3D printing, in place of the particle structure 30 located against the first outer surface 11 of the screen 10.

In an embodiment of the disclosure, the mask 40 is a matrix comprising ten columns and one hundred rows of pneumatic electrostatic valves 41 spaced 1 mm from one another. The columns are offset vertically from one another by 100 μm in order to obtain a resolution of 100 μm. The mask 40 is about 10 cm by 1 cm. The mask 40 and the flow generator 20 are coupled so as to be moved at the same time. The mask 40 and the flow generator 20 sweep the entire first outer surface 11 of the screen 10 in order to compose a structure 30 of powders against the screen 10 or a layer of powders against the first substrate 60.

The device 1 may be used for a 3D printing. For example, the first type of particles 3*a* may be suitable for forming an object via 3D printing using sintering and the second type of particles 3*b* may be a support powder that is not sintered. In some embodiments, the particles of the first type 3*a* may be sintered at a first sintering temperature and the particles of the second type 3*b* cannot be likely to be sintered at the first sintering temperature or be inert. The particles 3*b* of the second type may be used as a support for the upper strata during the 3D printing and be recovered at the end of the 3D printing.

In an embodiment of the disclosure, the particles 3*a* of the first type are particles of SLS powder provided for a laser sintering. In an embodiment of the disclosure, the particles 3*a* of the first type are made of thermoplastic polymer, for example PA12. In an embodiment of the disclosure, the particles 3*b* of the second type are made of ceramic, plaster or alumina.

Figure 7A:
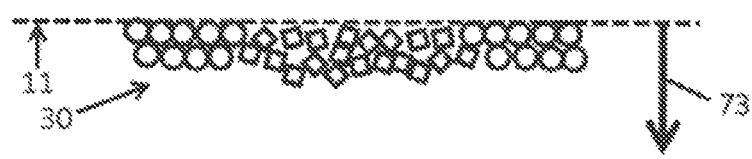
FIGS. 7a and 7b show a use of the particle structure in a 3D printing, according to an embodiment of the disclosure.
Figure 7A:
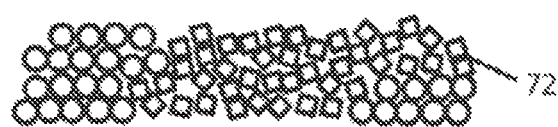
Figure 7B:
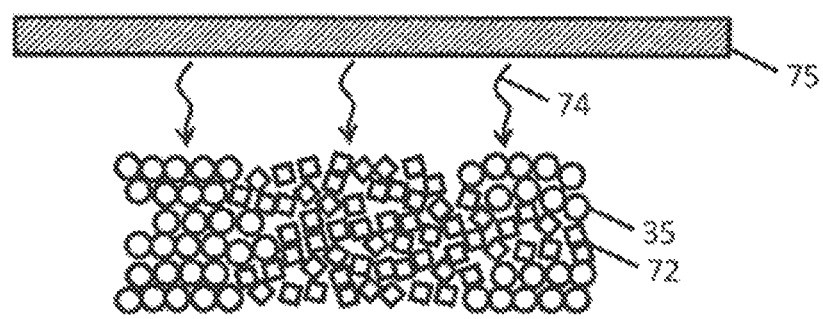

FIGS. 7*a* and 7*b* show a use of the particle 3 structure 30 in a 3D printing, according to an embodiment of the disclosure.

FIG. 7*a* shows the screen 10 under which the particle 3 structure 30 is formed and a 3D printing structure 72 which is an object in the process of 3D printing. The 3D printing structure 72 comprises many particles that are already agglomerated together. In other words, the 3D printing 72 comprises a stack of strata already agglomerated. A means of deposition of the particle 3 structure 30 makes it possible to deposit the particle 3 structure 30 on the 3D printing structure 72. The particle 3 structure 30 thus becomes a stratum 35 of particles 3. The particles 3 of the stratum 35 may thus be agglomerated (FIG. 7*b*) with the 3D printing structure 72 so as to form a new 3D printing structure on which may be deposited another particle 3 structure 30. The agglomeration may be carried out by an agglomeration means 75, that for example heats or radiates the stratum 35 of particles 3. The agglomeration may be suitable for agglomerating the particles of the first type 3*a* but not the particles of the second type 3*b*.

In an embodiment of the disclosure, the agglomeration means 75 comprises a laser. In an embodiment of the disclosure, the agglomeration means 75 comprises a means of emitting an infrared radiation (for example a halogen lamp), which may be uniform over the entire stratum 35 of particles 3.

The deposition means makes it possible to move the screen 10 with the particle 3 structure 30 from a formation zone, where the particle 3 structure 30 had been formed, to a printing zone where the 3D printing structure 72 is located. This first movement may for example be horizontal and/or vertical. In some embodiments, the deposition means makes it possible to move the screen 10 with the particle 3 structure 30 to the 3D printing structure 72 as indicated by the arrow 73 in FIG. 7*a*.

The deposition means may also make it possible to detach the particle 3 structure 30 from the first outer surface 11 of the screen 10. The deposition means may be arranged to detach the entire structure 30 from the first outer surface 11 in one go, or to detach selected portions from the first outer surface 11.

Figure 8A:
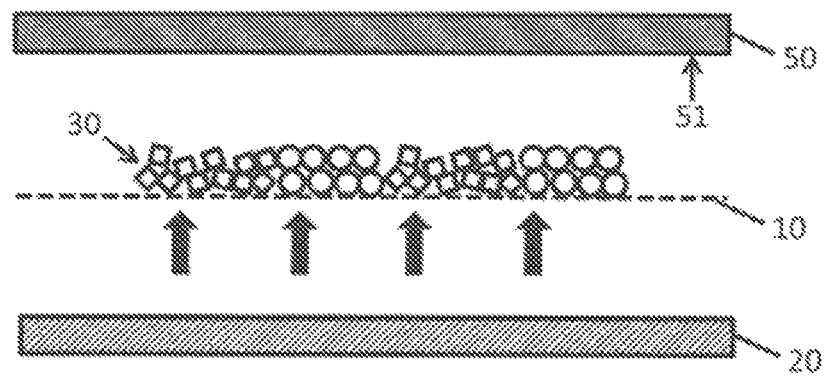
FIGS. 8a and 8b show a use of the particle structure in a 3D printing, according to an embodiment of the disclosure.
Figure 8B:
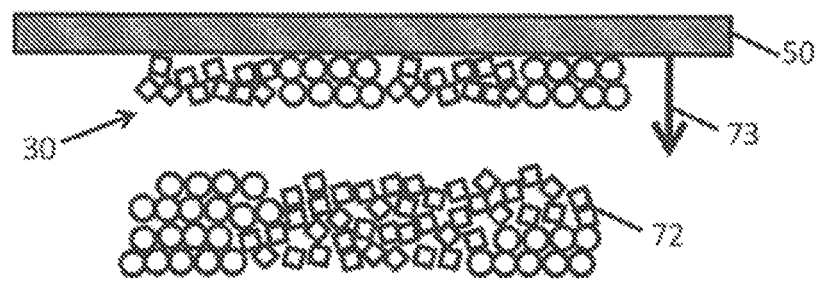

FIGS. 8*a* and 8*b* show a use of the particle 3 structure 30 in a 3D printing, according to an embodiment of the disclosure.

The particle structure 30 present on the first outer surface 11 is first of all transferred under a transfer surface 51 of the mobile transfer substrate 50. This may, for example, be carried out using an ejection device of the flow generator 20.

Then, the transfer substrate 50 is moved so as to deposit the particle 3 structure 30 on the 3D printing structure 72 as indicated by the arrow 73 in FIG. 8*b*. The agglomeration method shown in FIG. 7*b* may then be used.

When the 3D printing is completed, if the particles 3*b* of the second type have not been agglomerated, they are detached from the printed object.

Figure 9:
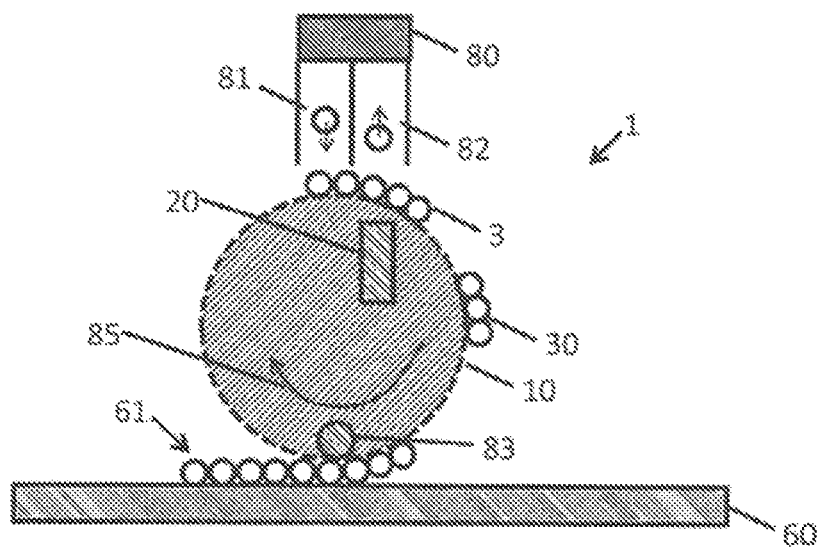
FIG. 9 shows a device for manipulating particles according to an embodiment of the disclosure.

FIG. 9 shows a device 1 according to an embodiment of the disclosure wherein the screen 10 is a cylinder arranged to rotate according to a cylinder axis as indicated by the arrow 85. The first outer surface 11 of the screen 10 is cylindrical. In some embodiments, the flow generator 20 generates a transport fluid flow 2 that has at least one component perpendicular to the cylinder axis. The supply of particles 3 is provided by a supply element 80. The supply element 80 comprises a supply channel 81 for sending particles 3 to the first outer surface 11, a scraper (not shown) and a collection channel 82 for recovering the extra particles 3. The flow generator 20 is located inside the cylinder formed by the screen 10. It controls the transport fluid flow 2 to determine the portions of the first outer surface 11 on which the particles 3 are deposited. The flow generator 20 may comprise an ejection device.

The particle 3 structure 30 is maintained on the first outer surface 11 using an adhesion distributed over the first outer surface 21. It is detached from the first outer surface 11 using a detaching cylinder 83 that makes it possible to locally break the adhesion forces between the first outer surface 11 and the particles 3. The detached particles 3 are then deposited on the first substrate 60.

Figure 10:
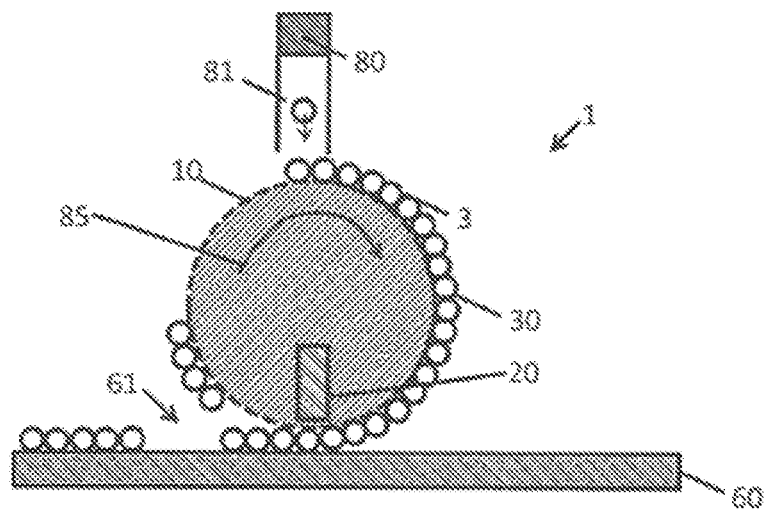
FIG. 10 shows a device for manipulating particles according to an embodiment of the disclosure.

In an embodiment of the disclosure shown in FIG. 10, the flow generator 20 is located facing the first substrate 60. The supply element 80 continuously deposits particles 3 on the screen. The cylindrical screen 10 continuously supplies particles 3 facing the flow generator 20. The particles 3 are selectively deposited on the first substrate 60 via ejection using the control of the flow generator 20, for example if the latter comprises an ejection device.

Figure 11:
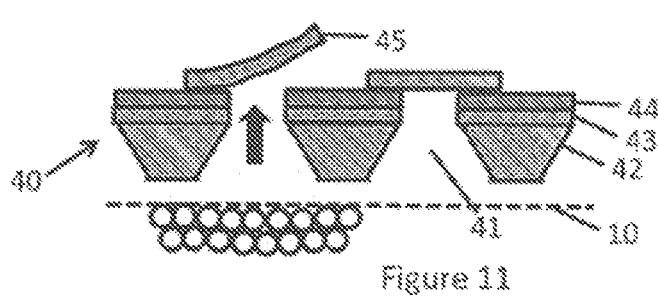
FIG. 11 shows a portion of the valve matrix 41 according to an embodiment of the disclosure.
Figure 12:
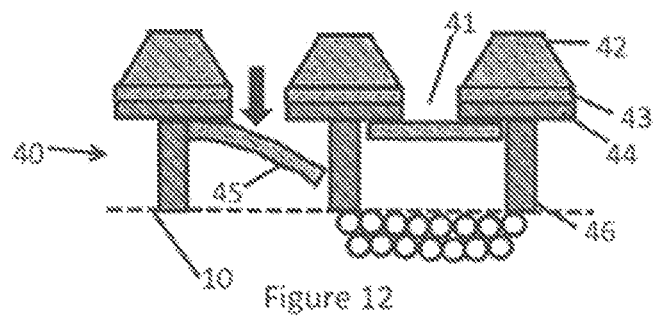
FIG. 12 shows a portion of the valve matrix 41 according to an embodiment of the disclosure.

FIG. 11 shows a portion of the valve matrix 41 according to an embodiment of the disclosure. FIG. 12 shows a portion of the valve matrix 41 according to an embodiment of the disclosure. Each valve preferably comprises a rigid portion 42, a first electrode 43, a dielectric portion 44 and a second electrode 45. The second electrode 45 is flexible and is provided to open and close. The second electrodes 45 may be, for example, made using a sacrificial layer or via assembly. In some embodiments, the valves 41 are arranged according to a network of lines and columns. The valves 41 may be addressed by passive addressing.

FIG. 11 corresponds to a case where the flow generator 20 comprises a suction device.

FIG. 12 corresponds to a case where the flow generator 20 comprises an ejection device. In an embodiment of the disclosure, separators 46 are provided in the space between the screen 10 and the valve matrix 41, to prevent the second electrode 45 from touching the screen 10.

Generally, each valve 41 may comprise a microactuator and/or a MEMS or PCB pneumatic microvalve. Such a microactuator may be, for example, electrostatic, thermal, electromagnetic, piezoelectric or other. The valve matrix 41 may be, for example, carried out by micromachining techniques from a silicon wafer. Each valve 41 may comprise one cavity, for example carried out by anisotropic etching thanks to KOH or a technique of deep reactive ion etching. Each valve 41 may comprise electrodes carried out by techniques of LPCVD deposition (low-pressure chemical-vapour deposition).

Figure 13:
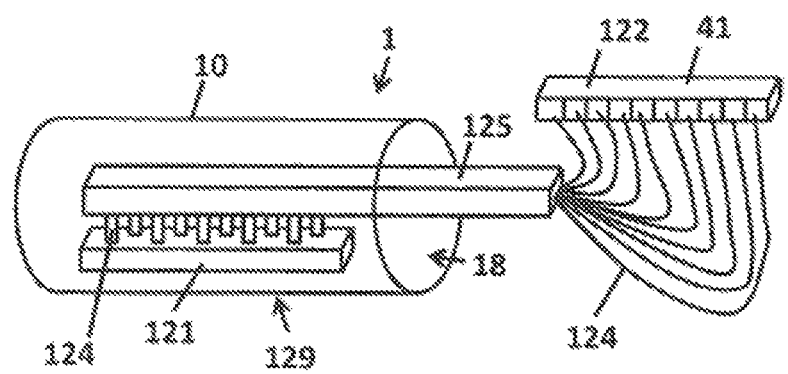
FIG. 13 shows a device according to an embodiment of the disclosure wherein the screen is cylindrical.
Figure 14:
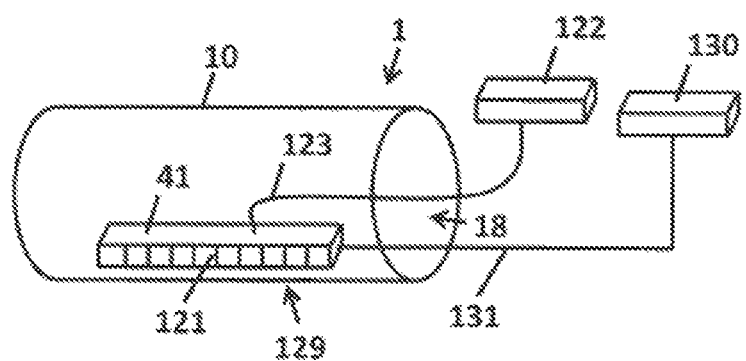
FIG. 14 shows a device according to another embodiment of the disclosure wherein the screen is cylindrical.

FIG. 13 shows a device 1 according to an embodiment of the disclosure where the screen 10 is cylindrical. FIG. 14 shows a device 1 according to another embodiment of the disclosure where the screen 10 is cylindrical. Any other shape of the screen 10 is possible. For example, any shape such that the first outer surface of the screen 10 is convex and delimits at least partially an interior space 18. The screen 10 comprises a detachment zone 129 where the particles are separated from the first outer surface 11. This detachment zone 129 may be located downwards, for example facing the 3D printing structure 72. In some embodiments, the flow generator 20 is an ejection device.

The flow generator 20 comprises a first portion 121 located inside the cylindrical screen 10. The first portion 121 comprises a print head located in the proximity of the detachment zone 129. In some embodiments, the print head is located between the axis of the cylindrical screen 10 and the detachment zone 129.

In some embodiments, the first portion 121 of the flow generator 20 comprises a plurality of openings directed towards the first outer surface 11 of the screen 10, for example towards the detachment zone 129. Each of the openings makes it possible to eject or to suction a transport fluid flow element. Thus, it is possible to decide which particles are ejected from the screen 10 or suctioned on the screen 10. The openings may be arranged to be staggered, such that the pixels of different lines are offset.

The first portion 121 of the flow generator 20 is connected fluidically to at least one fluidic communication means 123. This fluidic communication 123 means may for example comprise a plurality of pipes 124 (FIG. 13). The fluidic communication means 123 exit from the cylindrical screen 10 by one end of the latter. In some embodiments, the pipes 124 pass through a rigid duct 125 to exit from the cylindrical screen 10 (FIG. 13).

The flow generator 20 comprises a second portion 122 located outside of the cylindrical screen 10.

In the embodiment of the disclosure shown in FIG. 13, the second portion 122 of the flow generator 20 may comprise valves 41, for example arranged in a valve matrix 41. Each valve 41 is connected to a pipe 124. The valves 41 make it possible to control fluid flow elements that exit from the openings of the first portion 121 of the flow generator 20. Thus, it is possible to control the pixels of particles that are detached from the first outer surface of the screen 10 and are deposited on the 3D printing structure 72 or any other support located under the detachment zone.

The device 1 may comprise between 10 and 500 pipes 124, and in some embodiments between 50 and 200 pipes 124. In some embodiments, the outputs of the pipes 124 towards the detachment zone 129 are arranged to be staggered, so as to increase the resolution of the deposition.

The device 1 may comprise a means for cooling valves 41.

In the embodiment of the disclosure shown in FIG. 14, the first portion 121 of the flow generator 20 may comprise valves 41, for example arranged in a valve matrix 41. The valves 41 are fluidically connected by the fluidic communication means 123 to the second portion 122 of the flow generator 20. In some embodiments, the fluidic communication means 123 comprises one single pipe. However, it is possible, while still remaining within the scope of the disclosure, that it comprises a plurality of them. The valves 41 make it possible to control fluid flow elements that exit from the openings of the first portion 121 of the flow generator 20 facing the detachment zone 129. Thus, it is possible to control the pixels of particles that are detached from the first outer surface of the screen 10 and are deposited on the 3D printing structure 72 or any other support located under the detachment zone.

The valve matrix 41 may be connected to a control unit 130 by an electrical connection means 130. This electrical connection means 130 may be wireless or comprise at least one wire, that then passes, for example, through one end of the cylindrical screen 10.

Figure 15:
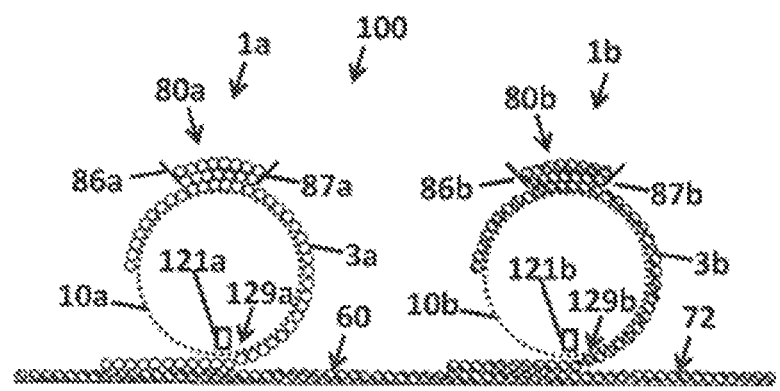
FIGS. 15 and 16 show a system comprising at least two devices for manipulating particles according to an embodiment of the disclosure.
Figure 16:
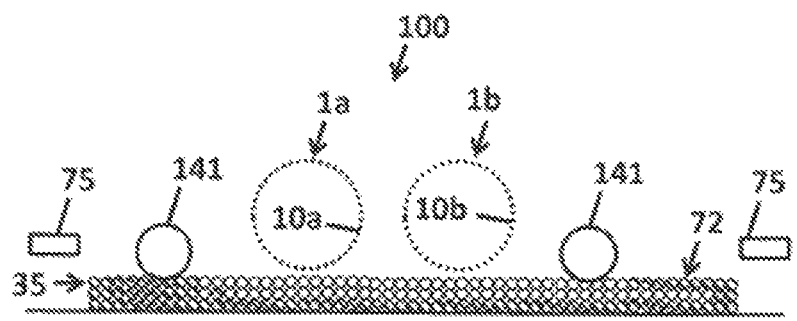

FIGS. 15 and 16 show a system 100 comprising at least two devices 1a, 1b for manipulating particles according to an embodiment of the disclosure. This system may be, for example, used in a 3D printing. The screens 10a, 10b and the flow generators are preferably such as described in reference to FIG. 13 or to FIG. 14. In some embodiments, the flow generators each comprise a first portion 121a, 121b located inside the cylindrical screen 10, in the proximity of the detachment zone 129a, 129b. Thus, the fluid flow elements emitted by the first portions 121a, 121b of the flow generators may eject the particles 3a, 3b present on the first outer surface of the screens 10a, 10b towards a precise position of the 3D printing structure 72. It is possible, while still remaining within the scope of the disclosure, that the system 100 comprises more than two devices 1 according to the disclosure. The screens 10a, 10b are arranged parallel to one another, for example with the axis thereof in the same horizontal plane.

In some embodiments, the devices 1a, 1b each comprise a supply element 80a, 80b formed by a first scraper 86a, 86b and a second scraper 87a, 87b. The particles 3a, 3b are released on the first outer surface of the screens 10a, 10b by the supply elements 80a, 80b when the screens 10a, 10b are rotating. In some embodiments, the position of the second scraper 87a, 87b with respect to the first outer surface is selected according to the thickness of the layer of particles 3a, 3b desired on the first outer surface. The scraper may be a roller scraper, for example a counter-rotation cylinder, which, for example, may vibrate.

The particles 3a, 3b are then retained on the first outer surface by a suction means (not shown).

In some embodiments, the particles 3a arranged by the first device 1a are particles 3a of a first type, for example likely to be agglomerated by a determined method. In some embodiments, the particles 3b arranged by the second device 1b are particles 3b of a second type, for example not likely to be agglomerated by this determined method.

In some embodiments, the screens 10a, 10b rotate by maintaining fixed the axis of rotation thereof when a stratum 35 is deposited, and the first substrate 60, which is used as a support for the 3D printing structure 72 advances in one direction or in another. It is also possible, while still remaining within the scope of the disclosure, that the screens 10a, 10b have the axis of rotation thereof which is moved parallel to the first substrate 60 and that the latter be fixed. It is also possible that the screens 10a, 10b and the first substrate 60 be moved in a coordinated manner.

The flow generators of the devices 1a, 1b, for example the valve matrices 41, are controlled so as to obtain the desired 3D printing structure 72. In some embodiments, they are controlled such that the stratum 35 formed by the particles 3a, 3b deposited by the devices 1a, 1b is continuous and does not comprise any holes.

When a stratum 35 of particles has been deposited, and before depositing the following stratum 35, the screens 10a, 10b are moved away from the 3D printing structure 72 by a distance, for example equal to the thickness of the stratum 35. This makes it possible to deposit the following stratum 35. It is possible that the successive strata 35 have different thicknesses.

In an embodiment of the disclosure, the system 100 further comprises at least one compaction roller 141 forming a means for uniformization of the height of the stratum of powder deposited on the 3D printing structure. In some embodiments, the system 100 comprises two uniformization means, each being located on a side of the screens 10a, 10b. In an embodiment of the disclosure, the system 100 further comprises at least one agglomeration means 75. In some embodiments, the system 100 comprises two agglomeration means 75, each being located on a side of the screens 10a, 10b, farther than the uniformization means.

In some embodiments, the system 100 operates in the following manner.

A bed of particles of the second type 3b, which are not likely to be agglomerated by the method carried out by the agglomeration means 75, is deposited on the first substrate 60. The particle bed forms the starting 3D printing structure 72.

The supply element 80a is filled with particles of the first type 3a, which are likely to be agglomerated by the method carried out by the agglomeration means 75. The supply element 80b is filled with particles of the second type 3b.

The screens 10a, 10b each rotate about the axis thereof, driving particles of supply elements 80a, 80b which are maintained above using an air suction, for example carried out by an exterior fan. The airflow of the suction is selected according to the type of powder. The thickness of the layer of particles 3a, 3b on the screen 10 may be between 50 μm and 500 μm. It is determined, for example, using the position of the second scrapers 87a, 87b. The thickness of the stratum 35 may be different from the thickness of the layer on the screen 10. Indeed, the particles of the stratum 35 may spread out after deposition. It is also possible to vary the thickness of the stratum 35 by varying the rotation speed of the screen and/or translation speed of the 3D printing structure 72.

The screens 10a, 10b are moved horizontally in a direction perpendicular to the axis thereof, so as to travel the 3D printing structure 72, while rotating about themselves. In some embodiments, the rotation and translation speeds are synchronised such that the relative speed of the point that is closest to the screen 10 and of the 3D printing structure 72 is zero. Thus, the particles do not have any speed tangential to the screen during the transfer, which makes it possible for a deposit of greater precision.

The particles that have not been deposited rise back towards the supply elements 80a, 80b and may be used afterwards.

In some embodiments, once the stratum 35 has been deposited, it is made uniform by the compaction roller 141, then agglomerated by the agglomeration means 75 so as to integrate the 3D printing structure 72. The following stratum 35 is thus deposited.

It is possible that the following stratum 35 is deposited on the return path with respect to the stratum that has just been integrated into the 3D printing structure 72. For example, the deposition of strata (as well as the compaction and the agglomeration) may be done from right to left, and from left to right. In this case, the system may comprise two uniformization means and two agglomeration means 75 as shown in FIG. 16.

Possible applications of the device 1 according to the disclosure relate to the 3D printing, 2D printing and dosing in the pharmaceutical industry.

In other words, the disclosure relates to a device 1 and a method for manipulating particles 3. The device 1 comprises a screen 10 used as a support for a particle 3 structure 30 which may selectively be deposited on a first substrate 60. The device 1 comprises a flow generator 20 that generates a transport fluid flow 2 to or from the first outer surface 11 of the screen 10, the transport fluid flow 2 being provided to transport the particles 3. The device 1 may be included in a 3D printing system.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A device for manipulating particles comprising:

a screen having a first outer surface suitable for supporting particles, the screen comprising through-holes opening via openings onto the first outer surface;

an ejection device arranged to create a transport fluid flow through the screen in order to eject particles from the first outer surface;

a first substrate arranged for receiving the particles ejected from the first outer surface, the screen and the first substrate being mobile with respect to each other; and a particle supply arranged to supply particles on the first outer surface, wherein the first substrate and the ejection device are located on opposite sides of the screen.

2. The device of claim 1, comprising a valve matrix arranged to select portions of the first outer surface through which the transport fluid flow passes.

3. The device of claim 2, wherein the screen comprises a detachment zone arranged to be crossed by transport fluid flow created by the ejection device, the first substrate being located below the detachment zone and the valve matrix being located above the detachment zone.

4. The device of claim 2, wherein the valves are piezoelectric valves.

5. The device of claim 1, wherein the first substrate is located below the screen.

6. The device of claim 1, further comprising a scraper for spreading the particles against the first outer surface.

7. The device of claim 1, further comprising a suction means arranged to retain particles on the first outer surface.

8. The device of claim 1, further comprising a blade arranged for scrapping particles forming protuberances on the first substrate.

9. The device of claim 1, further comprising an agglomeration means arranged to agglomerate the particles on the first substrate.

10. A method for manipulating particles, comprising:
providing a screen having a first outer surface, the screen comprising through-holes opening via openings onto the first outer surface; supplying particles to the first outer surface of the screen; supporting the supplied particles on the first outer surface; moving the screen with respect to a first substrate; providing an ejection device configured to create a transport fluid flow through the screen in order to eject the particles from the first outer surface to the first substrate, the first substrate and the ejection device being located on opposite sides of the screen; and receiving the particles ejected from the first outer surface on the first substrate.

11. The method of claim 10, wherein the particles are supplied by a particle source.

* * * * *